(12) United States Patent
Hoppe et al.

(10) Patent No.: US 6,982,714 B2
(45) Date of Patent: Jan. 3, 2006

(54) SYSTEMS AND METHODS FOR PROVIDING A FINE TO COARSE LOOK AHEAD IN CONNECTION WITH PARAMETRIZATION METRICS IN A GRAPHICS SYSTEM

(75) Inventors: Hugues Herve Hoppe, Redmond, WA (US); John Michael Snyder, Redmond, WA (US); Pedro Vieira Sander, Cambridge, MA (US); Steven Jacob Gortler, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 10/137,931

(22) Filed: May 1, 2002

(65) Prior Publication Data

US 2003/0206177 A1 Nov. 6, 2003

(51) Int. Cl.
  *G06T 15/30* (2006.01)
(52) U.S. Cl. .............. 345/423; 345/582; 345/428; 345/581
(58) Field of Classification Search ............... 345/582, 345/581, 428, 423
  See application file for complete search history.

(56) References Cited

U.S. PATENT DOCUMENTS 6,271,856 B1 * 8/2001 Krishnamurthy ............ 345/429

OTHER PUBLICATIONS

AbAdjev, V., et al., "MetaStream," *VRML 1999 Proceedings*, 1999, 53-62.
Cignoni, P. et al., "A general method for recovering attribute values on simplified meshes," *IEEE Visualization*, 1998, 59-67.
Cohen, J. et al., "Appearance-preserving simplification," *SIGGRAPH*, 1998, 115-122.
Eck, M. et al., "Multiresolution analysis of arbitrary meshes," *SIGGRAPH*, 1995, 173-182.
Floater, M., "Parametrization and smooth approximation of surface triangulations," *Comp. Aided Geometric Design*, 1997, 14(3), 231-250.
Garland, M. et al., "Hierarchical face clustering on polygonal surfaces," *Symposium on Interactive 3D Graphics*, 2001, 49-58.
Gortler, S. et al., "The Lumigraph," *SIGGRAPH*, 1996, 43-52.
Guskov, I. et al., "Normal Meshes," *SIGGRAPH*, 2000, 95-102.
Hinker, P. et al., "Geometric Optimization," *IEEE Visualization*, 1993, 189-195.
Hoppe, H., "Progressive Meshes," *SIGGRAPH*, 1996, 99-108.
Hormann, K. et al., "MIPS—an efficient global parametrization method," *Curve and Surface Design*, 1999, 153-162.
Hormann, K. et al., "Hierarchical parametrization of triangulated surfaces," *Vision, Modeling, and Visualization*, 1999, 219-226.

(Continued)

*Primary Examiner*—Matthew C. Bella
*Assistant Examiner*—Tam Tran
(74) *Attorney, Agent, or Firm*—Woodcock Washburn LLP (57) ABSTRACT

Systems and methods are provided for providing a fine-to-coarse look ahead in connection with parametrization in a graphics system. The use of a variety of parametrization metrics may be supplemented and improved by the fine-to-coarse look ahead techniques of the invention. First, the metric of a parametrization is minimized using a coarse-to-fine hierarchical solver, and then accelerated with a fine-to-coarse propagation. The resulting parametrizations have increased texture resolution in surface regions with greater signal detail at all levels of detail in the progressive mesh sequence.

27 Claims, 5 Drawing Sheets

OTHER PUBLICATIONS

Hunter, A. et al., "Uniform frequency images: adding geometry to images to produce space-efficient textures," *IEEE Visualization*, 2000, 243-251.

Igarashi, T. et al., "Adaptive unwrapping for interactive texture painting," *Symposium on Interactive 3D Graphics*, 2001, 209-217.

Kalvin, A. et al., "SuperFaces: Polyhedral approximation with bounded error," *Image Capture Formatting, and Display, SPIE Proceedings*, 1994, 2164, 2-13.

Kobbelt, L. et al., "A general framework for mesh decimation," *Proceedings of Graphics Interface*, 1998, 43-50.

Krishnamurthy, V. et al., "Fitting smooth surfaces to dense polygon meshes," *SIGGRAPH*, 1996, 313-324.

Lee, A. et al., "MAPS: Multiresolution adaptive parametrization of surfaces," *SIGGRAPH*, 1998, 95-104.

Lévy, B. et al., "Non-distorted texture mapping for sheared triangulated meshes," *SIGGRAPH*, 1998, 343-352.

Lindstrom, P. et al., "Fast and memory efficient polygonal simplification," *IEEE Visualization*, 1998, 279-287.

Maillot, J. et al., "Interactive texture mapping," *Computer Graphics Proceedings*, 1993, 27-34.

Maruya, M., "Generating texture map from object-surface texture data," *Eurographics '95*, 1995, 14(3), 397-405.

Milenkovic, V., "Rotational polygon containment and minimum enclosure," *Proc. of 14th ACM Symposium on Computational Geometry*, 1998, 8 pages.

Murata, H. et al., "Rectangle-packing-based module placement," *IEEE ICCAD*, 1995, 472-479.

Sander, P. et al., "Silhouette clipping," *SIGGRAPH*, 2000, 327-334.

Sloan, P.-P. et al., "Importance driven texture coordinate optimization," *Eurographics '98*, 1998, 17(3), 97-104.

Soucy, M. et al., "A texture-mapping approach for the compression of colored 3D triangulations," *The Visual Computer*, 1986, 12, 503-514.

Maruya, M., "Generating texture map from object-surface texture data," *Computer Graphics Forum (Proceedings of Eurographics '95)*, 1995, 14(3), 397-405.

Milenkovic, V., "Rotational polygon containment and minimum enclosure," *Proc. of 14th Annual Symposium on Computational Geometry*, ACM, 1998.

Murata, H. et al., "Rectangle-packing-based module placement," *IEEE ICCAD*, 1995, 472-479.

Peters, J. et al., "The Simplest Subdivision Scheme for Smoothing Polyhedra," *ACM Trans. on Graphics*, 1997, 16(4), 420-431.

Praun, E. et al., "Lapped Textures," *Proceedings of SIGGRAPH'00: 27th International Conference on Computer Graphics and Interactive Techniques Conference*, New Orleans, LA, Jul. 23-28, 2000.

Rabin, J.M., "The Geometry of the Super Flows," *Comms. Math. Physics*, 1991, 137(3), 533-552.

Sander, P. et al., "Silhouette clipping," *SIGGRAPH*, 2000, 327-334.

Sloan, P.-P. et al., "Importance driven texture coordinate optimization," *Computer Graphics Forum (Proceedings of Eurographics '98)*, 1998, 17(3), 97-104.

Soucy, M. et al., "A texture-mapping approach for the compression of colored 3D triangulations," *The Visual Computer*, 1986, 12, 503-514.

Wallace, R.S., "Modified Hough Transform for Lines," *Proceedings—CVPR '85, IEEE Computer Society Conference on Computer Vision and Pattern Recognition*, San Francisco, CA, Jun. 19-23, 1985, 665-667.

Briggs, W., "A Multigrid Tutorial," *SIAM*, Philadelphia, 1987.

Duchamp, T. et al., "Hierarchical Computation of PL Harmonic Embeddings," *Technical Report*, University of Washington, 1997.

Garland, M. et al., "Surface Simplification Using Quadric Error Metrics," *SIGGRAPH*, 1997, 209-216.

Haker, S. et al., "Conformal Surface Parameterization for Texture Mapping," *IEEE Trans. on Visual. and Comp. Graphics*, 2000, 6(2).

Hoppe, H., "New Quadric Error Metric for Simplifying Meshes with Appearance Attributes," *IEEE Visualization*, 1999, 59-66.

Sander, P. et al., "Texture Mapping Progressive Meshes," *SIGGRAPH*, 2001, 409-416.

Terzopolous, D. et al., "Sampling and Reconstruction with Adaptive Meshes," *CVPR*, 1991, 70-75.

Sander, P. et al, "Signal-Specialized Parametrization," *Eurographics Workshop on Rendering*, 2002, 1-11.

\* cited by examiner

SYSTEMS AND METHODS FOR PROVIDING A FINE TO COARSE LOOK AHEAD IN CONNECTION WITH PARAMETRIZATION METRICS IN A GRAPHICS SYSTEM

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2001, Microsoft Corp.

FIELD OF THE INVENTION

The present invention relates to systems and methods for providing a fine-to-coarse look ahead in connection with a parametrization metric utilized in connection with a parametrization process in a graphics computing system.

BACKGROUND OF THE INVENTION

Texture mapping lets a color signal be imaged onto geometry, giving the appearance of detail on coarse triangle meshes. Using textures is generally more efficient than refining the carrier geometry to represent the signal per vertex. While rasterization hardware has supported basic texture mapping for many years, it has recently begun to offer more powerful features. Multitexturing lets several textures contribute to a pixel fragment, and shader expression trees combine these textures using complex operations. In particular, the trend is towards more general programmability.

With this increased rasterization functionality, many surface signals other than color can be used to achieve new rendering effects, including bump mapping (where surface normals are the signal), displacement mapping (geometry), irradiance shading (spherical harmonics), and self-shadowing (horizon maps). These techniques provide further motivation to compress signals defined with vertex attributes into textures parametrized over the mesh.

There are numerous parametrization techniques. For example, Eck et al. propose the discrete harmonic map, which assigns non-uniform springs to the mesh edges. Duchamp et al. investigate multiresolution solution methods for computing harmonic maps. Floater proposes a similar metric with a different edge-spring weighting that guarantees an embedding for convex boundaries. Haker et al. compute conformal maps onto the sphere. Hormann and Greiner propose the MIPS parametrization, which attempts to preserve the ratio of singular values over the parametrization.

Maillot et al. base their metric on mesh edge springs of nonzero rest length, where rest length corresponds to edge length on the surface. Levy and Mallet use a metric that combines orthogonality and isoparametric terms.

Commonly assigned U.S. patent appln. Ser. No. 10/138,751 (the '751 application) teaches a parametrization technique that focuses on making textures as small as possible for an unknown surface signal. The geometric-stretch metric taught therein minimizes undersampling by integrating the sum of squared singular values over the map. Intuitively, this measures how distances in the domain get stretched when mapped onto the surface.

Thus, many schemes for flattening a surface chart into 2D minimize some form of a geometric distortion metric. Many of these distortion metrics are tailored for the authoring problem of mapping an existing image onto a surface mesh, rather than the problem of sampling a given surface signal.

In addition to geometric distortion metrics, there has also been some work in exploiting knowledge of the surface signal in optimizing parametrization schemes.

With respect to existing works in the area of signal-specialized chart parametrization, given an existing parametrization, Sloan et al. warp the square texture domain onto itself to more evenly distribute a scalar importance field. Terzopolous and Vasilescu approximate a 2D image using a warped grid of sample values. The warping is achieved using a dynamic simulation where grid edge weights are set according to local image content. Hunter and Cohen compress an image as a set of texture-mapped rectangles, obtained by k-d tree subdivision of the image based on frequency content.

With respect to the use of multi-chart parametrization, to avoid excessive distortion, an arbitrary mesh is generally parametrized using multiple charts. At the limit, distortion can be driven to zero by making each triangle its own chart. However, partitioning the surface into many charts has drawbacks. Such partitioning constrains mesh simplification, requires more inter-chart gutter space, leads to mipmap artifacts, and fails to exploit continuity across charts. Thus, a balance should be made between parametrization distortion and the drawbacks of charts. Several existing approaches, such as Eck et al., Garland et al., Krishnamurthy et al., Maillot et al. and Sander et al., directly partition the original mesh, while other schemes, such as Cignoni et al., Lee et al. and Sander, Gu et al., define the charts using mesh simplification. For an interactive 3D painting system, for example, Igarashi and Cosgrove construct charts based on the history of drawing operations. The texture resolution on a surface region is selected using the viewing resolution at the time the region was last painted. Commonly assigned copending U.S. patent appln. Ser. No. 10/138,289 (the '289 application) discloses a technique that provides improved parametrization optimized in accordance with a surface signal metric for efficient and accurate graphics reconstruction, wherein the technique automatically adapts to the content of the signal, and scales the charts based on this content.

Existing Parametrization techniques involve tradeoffs, and may be selected for various reasons. For example, the geometric approaches of Sloan et al., Terzopolous and Vasilescu, and Hunter and Cohen do not take any knowledge of the signal on the surface into account, fail to adequately capture information about signal directionality, which allows the parametrization to squash in the direction across the signal gradient and/or restrict the chart boundary to be a square. Some prior art approaches do not provide continuous solutions that adequately adapt to high frequencies along diagonal directions. Some approaches are too computationally intensive, or are impractically applied.

One application for parametrization schemes of all kinds, utilizing all sorts of metrics, some of which are describe above, is to create a progressive mesh (PM) representation, which encodes an arbitrary mesh as a simple base mesh $M^0$ and a sequence of n refinement operations called vertex splits. The PM defines an array $\{M^0 \ldots M^n\}$ of level-of-detail (LOD) approximations, and supports geomorphs and progressive transmission. Unlike multiresolution frameworks based on subdivision, the meshes in a PM have irregular connectivities that can accurately model sharp features (e.g., creases and corners) at all scales.

One challenge in the PM framework is handling texture maps. Hardware rasterization features, including bump maps, normal maps, and multitexturing, allow fine detail to be captured in texture images parametrized over the mesh. Processes that implicate sources for textures include sampling detailed scanned meshes, evaluating solid textures, ray tracing, and 3D painting. In this regard, there are various problems associated with parametrizing texture images over all meshes in a PM sequence. One particular problem is that sometimes the transition from a coarse mesh to a fine mesh is not smooth. For example, there may be, relatively speaking, very few samples devoted to a portion of high detail in a coarse mesh, which, when transitioning to the corresponding finely detailed mesh having, relatively speaking, a lot of samples devoted to the same portion of high detail in the fine mesh, causes artifacts as the switchover is made from relatively few samples in the coarse mesh to the relatively high number of samples in the fine mesh.

However, present approaches do not take this into account because earlier approaches represent the detail simply by storing signal values at the mesh vertices. The problem with such an approach is that in a coarser more simplified mesh, there are many fewer vertices, so the detail defined on the fine mesh cannot be accurately represented using just signal values at the vertices. Hormann, Greiner and Campagna provide techniques relating to hierarchical parametrizations of triangulated surfaces. Their techniques solve a sequence of progressively more refined parametrization problems, e.g., a progressive mesh sequence, but their techniques do not gather any information about finer levels when parametrizing the coarser meshes. Accordingly, it would be desirable to provide a technique for use in connection with the generation of a progressive mesh sequence, whereby if there is a lot of detail in a region of the fine surface, additional samples are allocated in parametrizing that same region on the coarser meshes.

SUMMARY OF THE INVENTION

In view of the foregoing, the present invention relates to systems and methods for providing a fine-to-coarse look ahead in connection with parametrization in a graphics system. The use of a variety of parametrization metrics may be supplemented and improved by the fine-to-coarse look ahead techniques of the invention. First, the metric of a parametrization is minimized using a coarse-to-fine hierarchical solver, and then accelerated with a fine-to-coarse propagation. The resulting parametrizations have increased texture resolution in surface regions emphasized by the selected parametrization metric at all levels of detail in the progressive mesh sequence.

Other features and embodiments of the present invention are described below.

BRIEF DESCRIPTION OF THE DRAWINGS

The file of this patent includes at least one drawing executed in color. Copies of this patent with color drawings will be provided by the United States Patent and Trademark Office upon request and payment of the necessary fee.

The system and methods for providing a fine-to-coarse look ahead in connection with a parametrization in accordance with the present invention are further described with reference to the accompanying drawings in which.

DETAILED DESCRIPTION OF THE INVENTION

Overview

As described in the background, there are a number of pre-existing techniques for parametrizing a mesh for later reconstruction. For instance, the techniques of Hormann, Greiner and Campagna solve a sequence of progressively more refined parametrization problems; however, their techniques do not gather any information about finer levels when parametrizing the coarser meshes, and thus provide no "look ahead" as provided in accordance with the invention. The present invention provides a technique that improves on the use of pre-existing parametrization metrics in connection with the generation of an array of level of detail approximations of the surface mesh.

A main contribution of the invention is the provision of efficient parametrization algorithm(s) to minimize a parametrization metric using a multiresolution hierarchy in connection with which (1) the metric values are computed on the fine mesh triangles, and propagated fine-to-coarse in the hierarchy and (2) the chart is parametrized using a coarse-to-fine optimization, by transforming and evaluating the metric values.

The algorithm(s) are incorporated in a system for creating parametrizations of meshes. By allocating greater texture density to surface regions that have the characteristic(s) looked for by the parametrization metric, the resulting parametrizations reduce signal approximation error for the characteristic(s) for a given texture size or permit smaller textures for a given approximation error.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with a parametrization process. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate a parametrization process that may utilize the techniques of the present invention.

Figure 1A:
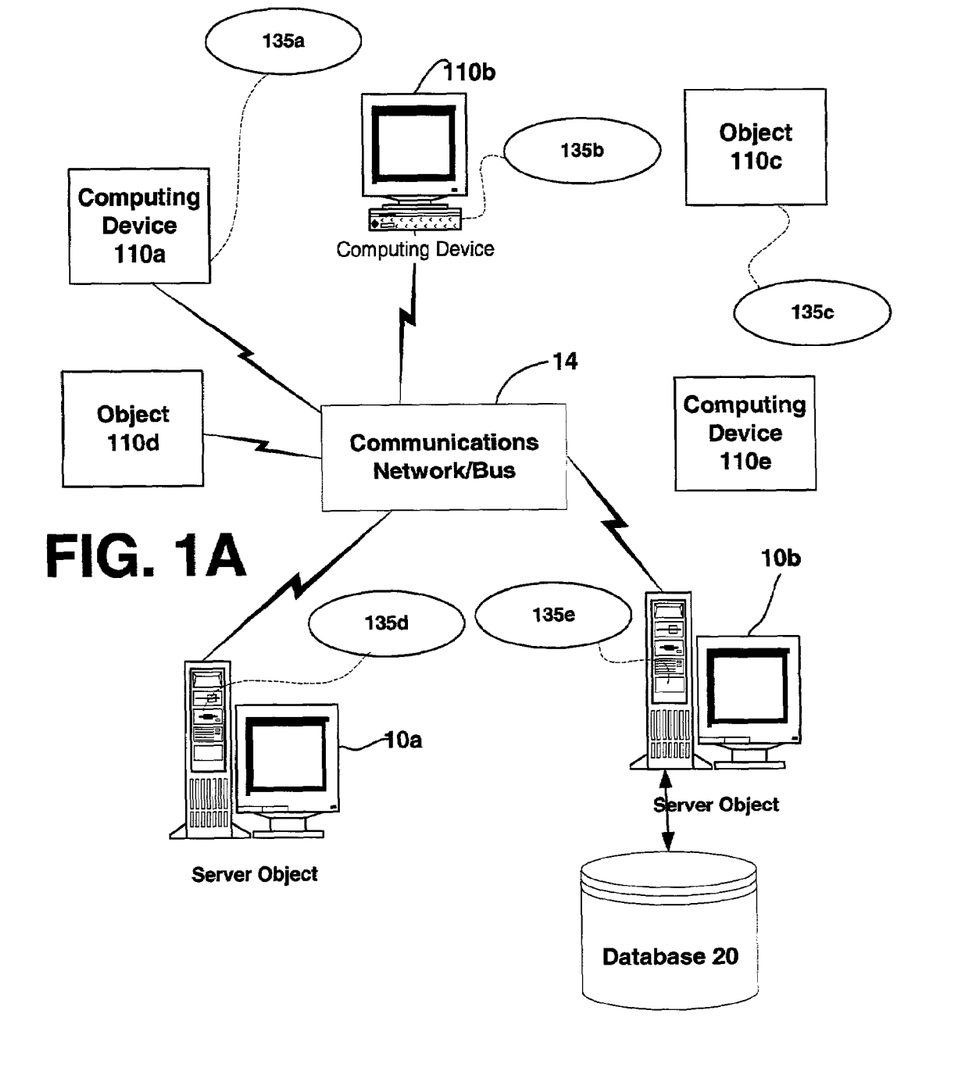
FIG. 1A is a block diagram representing an exemplary network environment having a variety of computing devices in which the present invention may be implemented.

FIG. 1A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 1A. In accordance with an aspect of the invention, each object 10 or 110 may contain an application that might request parametrization services.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Parametrization services in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since graphical object(s) may in practice be physically located in one or more locations, the ability to distribute parametrization services is of great utility in such a system.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 layers, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support unique protocol such as Power line, data (both wireless and wired), voice (e.g., telephone) and entertainment media. Most home control devices such as light switches and appliances may use Power line for connectivity. Data Services may enter the home as broadband (e.g., either DSL or Cable modem) and are accessible within the home using either wireless (e.g., HomeRF or 802.11b) or wired (e.g., Home PNA, Cat 5, even Power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to the parametrization of graphics object(s) in connection with the present invention.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 1A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 1A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process graphical object(s).

In a network environment in which the communications network/bus 14 is the Internet, for example, the servers 10a, 10b, etc. can be Web servers with which the clients 101a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing graphics object(s) or intermediate graphics object(s) processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 1B:
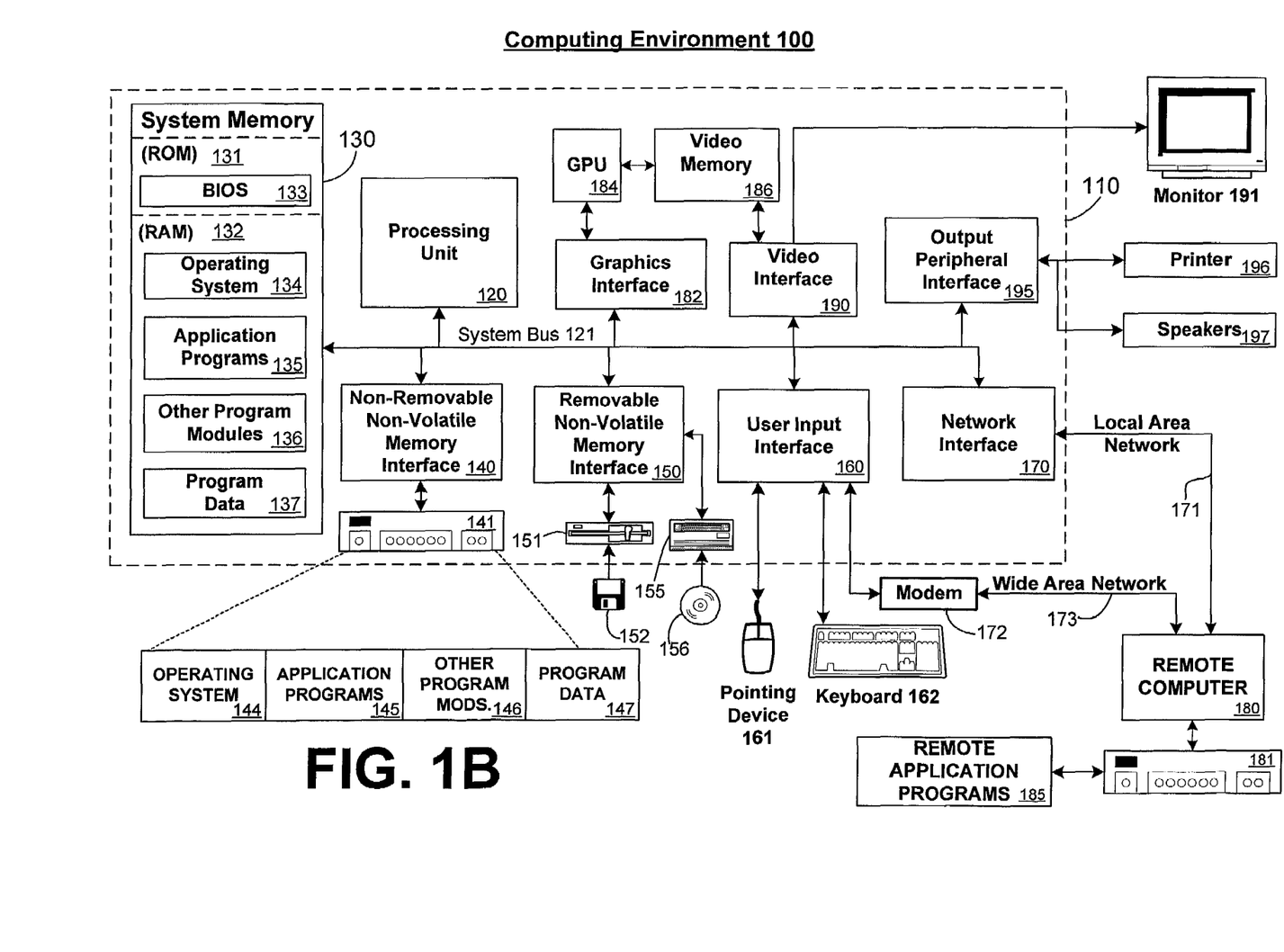
FIG. 1B is a block diagram representing an exemplary non-limiting computing device in which the present invention may be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the parametrization techniques of the invention.

Although not required, the invention can be implemented via an operating system, for use by a developer of services for a device or object, and/or included within application software that operates in connection with the parametrization of graphics object(s). Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable, nonvolatile memory interface such as interface 140, and magnetic disk drive 151 and optical disk drive 155 are typically connected to the system bus 121 by a removable, nonvolatile memory interface, such as interface 150.

The drives and their associated computer storage media discussed above and illustrated in FIG. 1B provide storage of computer readable instructions, data structures, program modules and other data for the computer 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that parametrization services may be performed by, supported in or accessed via all of NET's languages and services, and in other distributed computing frameworks as well.

Fine To Coarse Look Ahead

As discussed above, there are many different existing parametrization metrics that can be used in connection with computer graphics. In accordance with the invention, first, the metric of a parametrization is minimized using a coarse-to-fine hierarchical solver, and then accelerated with a fine-to-coarse propagation. The resulting parametrizations have increased texture resolution in surface regions emphasized by the selected parametrization metric at all levels of detail in the progressive mesh sequence.

It is often difficult to create a parametrization as a single unfolding, and so generally, a surface can be partitioned into charts, each of which is parametrized onto a region of the domain. Using such a parametrization, the surface signal is sampled into a texture image of the appropriate resolution. Then, at runtime, hardware rasterization reconstructs the signal on each pixel fragment, typically using bilinear interpolation of the texture samples, and possibly with mipmapping and anisotropic filtering.

Figures 2A, 2B:
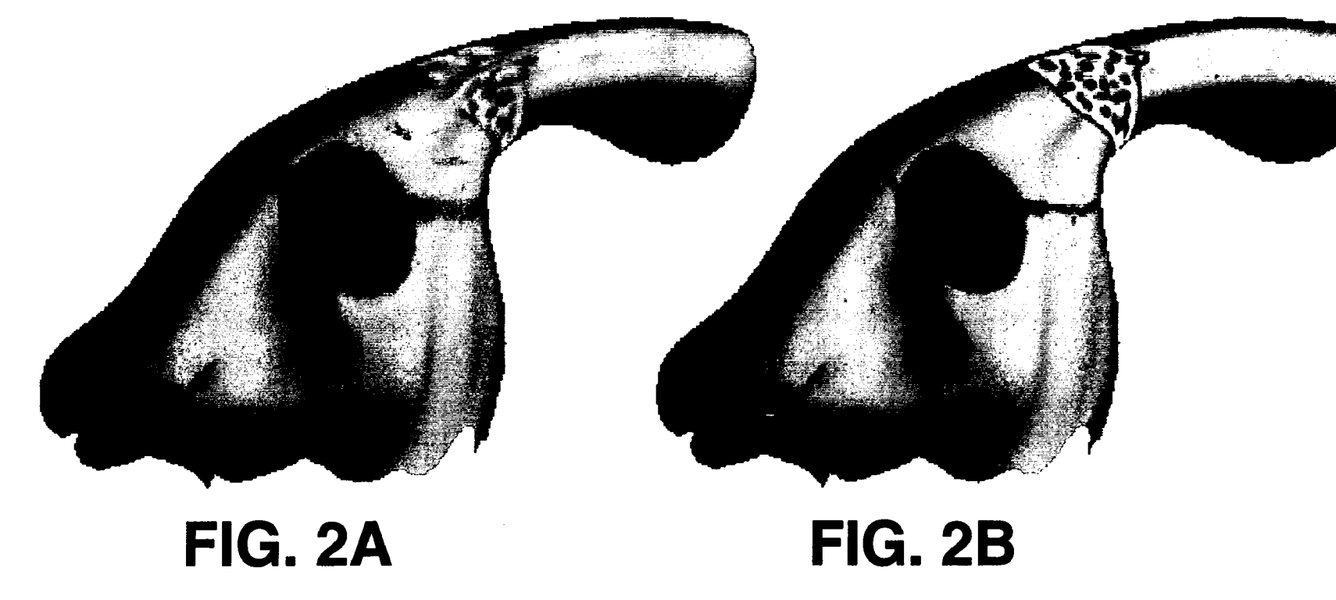
FIGS. 2A and 2B illustrate a comparison of the application of a geometric-stretch metric to the application of the signal-stretch metric of the invention.

At the outset, FIGS. 2A and 2B illustrate the results of two different parametrization schemes. The parasaur of FIG. 2A was generated from a pure geometric-based metric blind to the surface signal, such as taught by the '751 application whereas the parasaur of FIG. 2B was generated from a signal-specialized parametrization, such as taught by the '289 application. In each case, the surface signal is captured into a 128×128 texture. Intuitively, one can observe the tradeoffs between these two parametrization metrics. One can observe, for example, that the geometric-based technique attempts to minimize geometric-stretch of the image, thereby attempting to give extra mesh detail to those areas where geometry rapidly and/or abruptly changes, e.g., at the mouth of the parasaur; however, where geometry is not rapidly and/or abruptly changing, but there is nonetheless a great amount of detail in the signal on the surface, the geometric based metric performs poorly at reconstruction. For instance, at the bandana, and the edges of the eye patch, the geometry of the parasaur head is relatively smooth, but the signal is rapidly changing, and thus the geometric metric has not performed as well whereas the signal specialized metric reproduces the detail of the signal better.

Figure 2C:
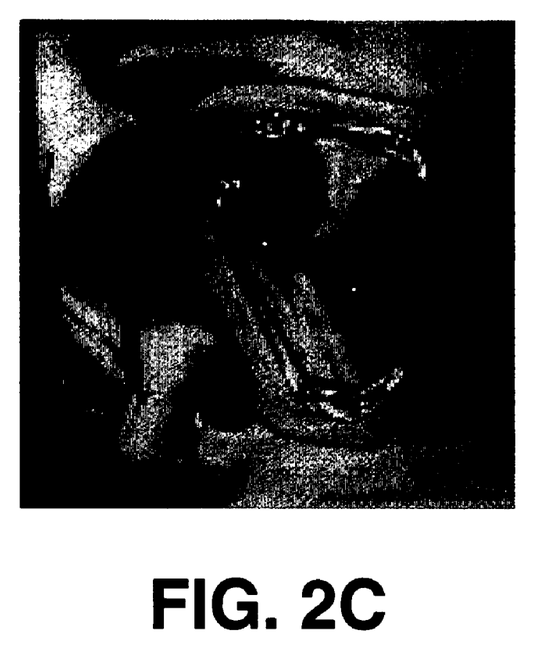
FIGS. 2C and 2D illustrate texture domain representations of the images of FIGS. 2A and 2B, respectively.
Figure 2D:
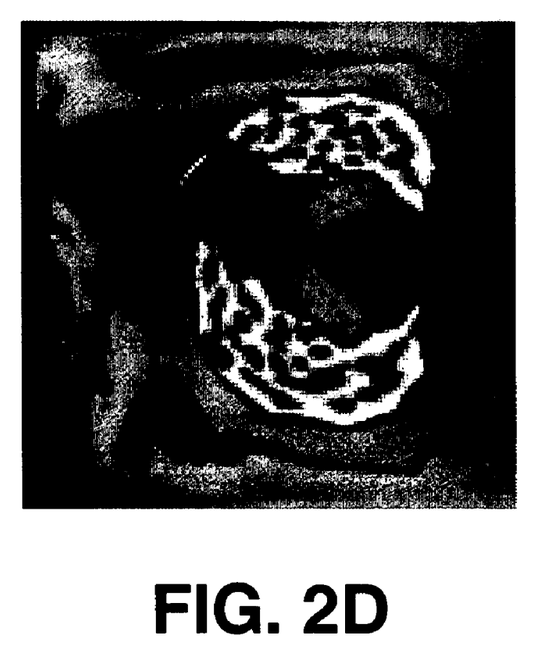

FIGS. 2C and 2D illustrate texture domain representations of the images of FIGS. 2A and 2B, respectively. One can easily see the comparatively greater informational bandwidth given to the bandana in FIG. 2D compared to FIG. 2C, and likewise the greater information given to the strap of the eye patch. These are places where the signal on the surface of the parasaur is changing rapidly, but the geometry is relatively unchanged. Accordingly, there are a variety of parametrization metrics in connection with which the present invention may be utilized.

Affine Transformation Rule for a Parametrization Metric

The parametrization results can be modified in an affine transform of each mesh triangle, such that a new parametrization metric value for a transformed triangle can be computed from its original parametrization metric value. The original parametrization metric values can be pre-computed on the original mesh faces with respect to canonical face parametrizations. During optimization, an affine transform rule can be provided depending upon the particulars of the parametrization metric implicated in order to quickly evaluate the modified parametrization metric.

Chart Parametrization Algorithm Utilizing a Parametrization Metric

An exemplary chart parametrization algorithm may be implemented as follows. After obtaining some initial chart parametrization, the parametrization metric may be minimized by repeatedly updating individual vertex (s,t) coordinates using line searches in the domain. To prevent parametric folding, each vertex may be constrained to remain in the kernel of its neighbors.

With respect to the parametrization metric, parametrization metric values are first computed on each triangle. Then, any perturbation of a vertex during optimization induces an affine transform on each of its adjacent faces. The sum of the parametrization metric values on these affinely transformed triangles are then minimized.

However, optimizing the chart parametrization using a uni-resolution algorithm has slow convergence, and often converges to bad local minima, depending upon the parametrization metric selected.

Thus, both the speed and result of optimization are improved with the invention using a novel multiresolution optimization algorithm. In this regard, a hierarchy is established over the chart using a progressive mesh (PM) representation. This PM is constructed by simplifying the chart mesh using a sequence of half-edge collapses, with a quadric error metric that seeks to preserve the characteristics of the original mesh worked upon by the selected parametrization metric.

Then, as described in more detail below, this PM sequence is used (1) to propagate the parametrization metric values fine-to-coarse from the original mesh to all coarser meshes, and (2) to apply a coarse-to-fine parametrization algorithm that uses these parametrization metric values.

Fine-to-Coarse Metric Propagation

For the hierarchical optimization technique of the invention, the parametrization metric values defined on triangles of the fine mesh are redistributed to the triangles of the coarser meshes in the PM sequence. This redistribution is generally inexact, because the triangles in the meshes at different resolutions lack any nesting property on the surface.

For the parametrization metric values to be transferred between faces, they are expressed with respect to a common coordinate system. The invention utilizes the current parametrization for this purpose. The parametrization metric values in the fine mesh triangles are affinely transformed from their canonical frames to their shapes in the current parametrization.

Figure 3:
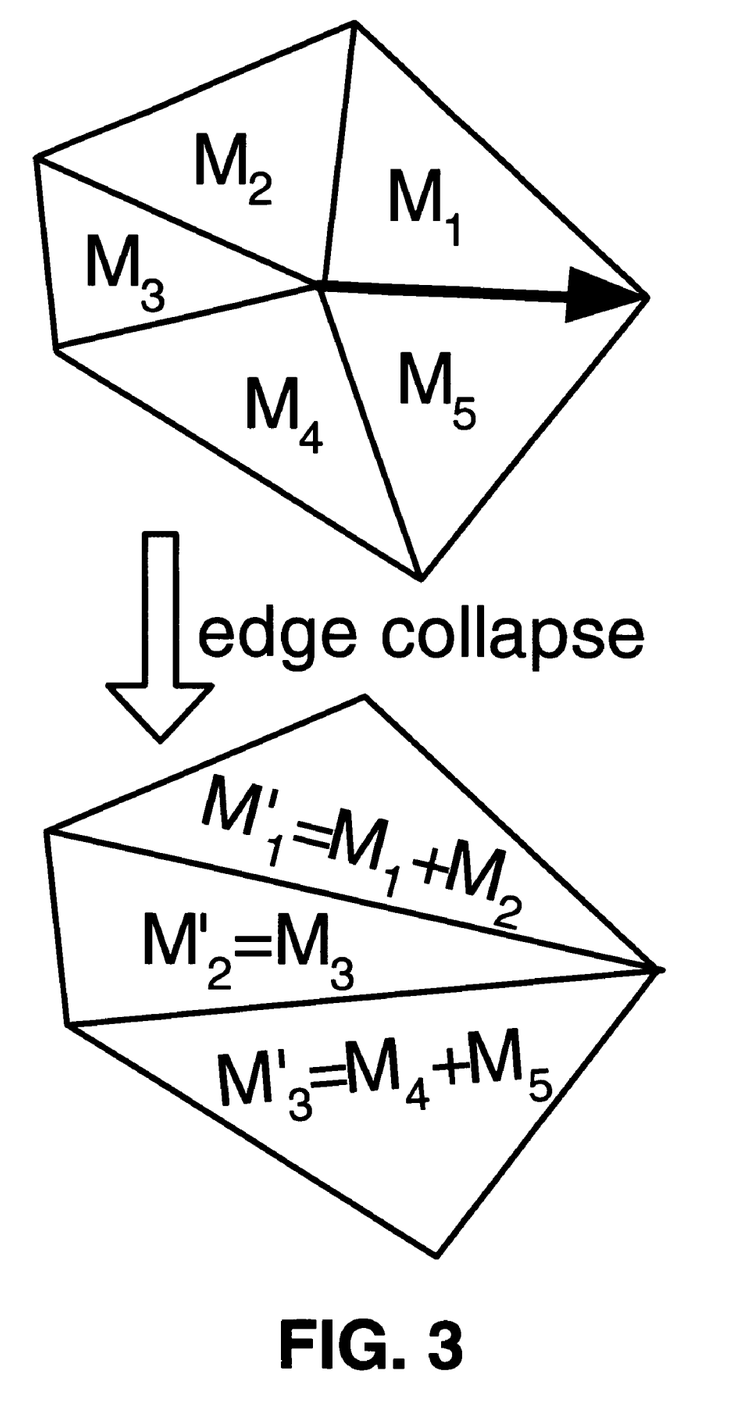
FIG. 3 illustrates an edge collapse algorithm in accordance with the invention.

Then, for each half-edge collapse in the PM sequence, the parametrization metric values are redistributed using the simple scheme illustrated in FIG. 3, whereby for each coarse triangle of a coarse mesh originating from, or associated with, two or more finer triangles of a finer mesh, the sum of the parametrization metric values for each finer triangle is assigned to the coarse triangle. This heuristic scheme has the property that the sum of parametrization metric values over mesh triangles is maintained at all levels of detail. Also, the redistribution weights are independent of the current parametrization. In other embodiments, more complex redistribution weights based on parametric overlap areas could be utilized, however, these alternate embodiments generally do not perform as well because the parametrization can initially be poor, i.e., contain highly stretched triangles. In this regard, because the parametrization metric value associated with each subsequent mesh triangle of a coarser mesh than the previous mesh embodies at least one parametrization metric value of the previous mesh for that portion of the mesh, sampling information from the finest level of detail approximation is propagated through to the coarser level of detail approximations. In this way, the invention provides a fine-to-coarse (FTC) propagation of the finest level of detail approximation to the coarser level of detail approximations, to preserve sampling proportionality for regions of fine detail even at coarse levels of detail.

Coarse-to-Fine Parametrization

The coarse-to-fine algorithm of the invention is performed as follows. First, an initial embedding is created for the few faces in the PM base mesh using a brute-force optimization, but also using the parametrization metric values propagated from the fine mesh. Then, for each vertex split refinement operation in the PM sequence, the newly added vertex is placed at the centroid of the kernel of its neighborhood polygon. The placement of the added vertex and its neighbors is then optimized using parametrization metric values. The following exemplary non-limiting pseudocode describes an embodiment of the invention:

```
// Parametrize the newly added vertex and its neighbors.
procedure optimize_vertex_split(Vertex vnew)
    // obtain initial (s,t) such that the neighborhood is an embedding
    vnew.st:=centroid(kernel(Neighborhood(vnew)))
    optimize_vertex_parametrization(vnew)
    repeat vertex_niter times
        for (v ∈ Neighbors(vnew))
            optimize_vertex_parametrization(v)
        optimize_vertex_parametrization(vnew)
```

In case the selected parametrization metric can have zero gradient, e.g., where the characteristic of the mesh measured by the parametrization metric is locally constant on a region of the surface, as a regularizing term, the invention may add a tiny fraction of another characteristic of the mesh, such as a geometry term, to the minimized energy functional. This prevents the formation of degenerate triangles, and ensures that new vertices find non-degenerate neighborhood kernels.

Iterated Multigrid Strategy

The coarse-to-fine (CTF) optimization thus creates a new parametrization of the fine mesh. The new parametrization modifies the transformed parametrization metric values on the fine mesh triangles. These transformed parametrization metric values can be propagated fine-to-coarse (FTC), to be used in another iteration of CTF optimization. This process is similar to the V-cycle commonly used in multigrid optimization, but applied here to irregular, non-nested grids. In classical multigrid, the coarse-level operation is uniquely defined using a restriction operation. In our setting, the mapping g is given at the fine resolution only. Thus, the energy on some coarse mesh can be defined given some pointwise mapping between the fine and coarse meshes. The invention thus obtains this mapping implicitly by solving for a parametrization at the finest level and using this parametrization to propagate Integrated Metric Tensors (IMT) fine-to-coarse. Thus, the current fine-level solution is actually used to define the coarse-level problem.

To bootstrap this iterative optimization process, an initial parametrization is utilized to transform the parametrization metric values on the finest mesh. This initial parametrization may be obtained using a CTF optimization with a metric that considers the geometry of the mesh. Since parametrization metric values are not yet present, the CTF optimization makes reference to the geometry of the coarse meshes, i.e., x, y, z at each vertex. The intuition represented by this is that a simplified mesh forms a good geometric approximation, and therefore its parametrization is a good starting state for parametrizing a finer mesh.

The high-level algorithm can be summarized with the following exemplary non-limiting pseudocode:

```
procedure optimize_chart_parametrization
Pre-compute canonical parametrization metric values on fine mesh faces.
Construct progressive mesh of chart.
// Initialize the parametrization:
CTF optimize geometric metric without parametrization metric values.
// iteratively optimize using parametrization metric:
repeat ftc_ctf_niter times
    Transform fine mesh parametrization metric values using current
    parametrization.
    FTC propagate parametrization metric values to all PM meshes.
                                    // Fine-to-Coarse Metric Propagation
    CTF optimize signal-stretch using parametrization metric values.
                                    // Coarse-to-Fine Parametrization
```

It is noted that one may use CTF optimization directly on the per-vertex characteristic(s) of the mesh measured by the parametrization metric instead of on the parametrization metric values. However, a problem with such a technique is that the characteristic(s) may vary too much. For example, unlike a geometric signal, a surface signal is not well approximated on a coarser mesh. As an example, a colormap signal usually zigzags across the unit Red Green Blue (RGB) cube many times as one traverses the surface. Thus, an optimized coarse mesh often fails to adequately "reserve" space in the parametric domain for signal detail present in the finer meshes. Thus, the parametrization metric values and their FTC propagation provide this look ahead capability.

Chart Boundary Optimization

To improve the parametrization quality, chart boundary vertices are allowed to move in the texture domain in accordance with the invention, at all levels of the coarse-to-fine optimization algorithm. For this to work, the invention overcomes the following two problems.

First, the geometric-stretch and signal-stretch metrics are not scale-invariant. These functionals go to zero as the chart becomes infinitely large. Scale-invariance is achieved by the invention by multiplying the functionals by total chart area. This is preferable to multiplying per-triangle stretch by per-triangle area because it is computationally more stable.

Second, it is possible for the optimized chart boundary to self-intersect. To prevent this, when optimizing a chart boundary vertex, the invention tests for intersections between the two adjacent boundary edges and the remaining boundary edges. Since there are typically $m$ boundary elements for a chart of m vertices, this brute-force testing is not unduly cumbersome.

One limitation of allowing the chart boundary to take on an arbitrary shape in D is that it imposes constraints on subsequent mesh simplification. More vertices need to be retained on the simplified mesh to represent the boundaries, because their irregular parametric shapes are difficult to approximate with coarse polygons. The approach of the invention is thus to simplify the mesh prior to parametrizing it.

Growth to Bounding Rectangle

For a single chart, the invention embeds its parametrization into a square texture image. For multi-chart meshes, the invention finds the tightest bounding rectangle around each chart, and packs these rectangles within the texture. In either case, some texture regions within the bounding square or rectangle are left unused. To reduce these wasted regions, the invention encourages the chart to grow into the unused space, which is achieved using an additional FTC-CTF iteration where the chart area penalty is removed, but the chart boundary is constrained to remain within the original bounding rectangle.

CONCLUSION

A multiresolution algorithm was introduced herein that accumulates the variation of the characteristic(s) looked for by a selected parametrization metric onto the faces of coarser meshes, to provide "look ahead" during coarse-to-fine optimization. Such a look ahead technique can be applied to any parametrization process because a look at fine detail helps to parametrize at the coarse level of detail such that there is a smooth, efficient transition from a coarse level of detail to a fine level of detail, and vice versa.

The invention thus takes the finest level of detail into account while constructing parametrization(S) on the coarser levels of mesh detail, so that the solutions obtained on coarser meshes accurately predict the final parametrization solution obtained at the end of the coarse-to-fine refinement process.

If there is a lot of detail in a region of the fine surface, additional space is thus allocated in parametrizing that region on the coarser meshes. Prior art approaches represented the detail by storing signal values at the mesh vertices. The problem with such approaches has been that in a coarser (simplified) mesh, there are much fewer vertices, so the detail defined on the fine mesh cannot be accurately represented using atomic signal values at the vertices. The invention thus provides a solution by storing information on the mesh faces that sums up, or integrates, the presence of detail in the fine mesh, in order to adequately reserve space on the coarse mesh parametrization for detail not yet added during the refinement process.

As mentioned above, while exemplary embodiments of the present invention have been described in connection with various computing devices and network architectures, the underlying concepts may be applied to any computing device or system in which it is desirable to reconstruct signals from point samples with minimal error. Thus, the techniques for providing improved signal processing in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent parametrization achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for providing a fine-to-coarse look ahead in connection with parametrization in a graphics system, wherein parametrization refers to a one-to-one mapping between all points of a mesh and all points in the corresponding parametric domain, comprising:

parametrizing at least one chart of a mesh utilizing a parametrization metric that generates and optimizes a plurality of metric values for said mesh, wherein the parametrization metric is based upon a function of at least one characteristic of the mesh; and generating a sequence of meshes in a multiresolution representation having a plurality of level of detail mesh approximations ranging from a coarsest level of detail approximation to a finest level of detail approximation for said at least one chart based upon at least said plurality of metric values, wherein the finest level of detail concerning said at least one characteristic of the mesh is taken into account while generating the parametrizations for level of detail approximations coarser than said finest level of detail approximation wherein generating includes propagating the plurality of metric values fine-to-coarse from the original mesh to all meshes coarser than the original mesh; wherein said generating further includes generating an intermediate parametrization by applying a coarse-to-fine parametrization algorithm that is based upon the propagated parametrization metric values; wherein the presence of said at least one characteristic is one of summed up and integrated, and stored as information for each mesh face of the fine mesh, to adequately reserve space on the coarse mesh parametrization for the presence of said at least one characteristic not yet added during said application of the coarse-to-fine refinement process.

2. A method according to claim 1, wherein said propagating includes redistributing the metric values defined on triangles of the finest mesh to the triangles of the coarser meshes in the sequence of meshes.

3. A method according to claim 1, wherein said applying of a coarse-to-fine parametrization algorithm includes creating an initial embedding for at least one face in the original mesh using a brute-force optimization and the propagated metric values from the fine mesh.

4. A method according to claim 3, wherein said applying of a coarse-to-fine parametrization algorithm further includes:

for each vertex split refinement operation, placing the newly added vertex at a location within the kernel of its neighborhood polygon; and optimizing the placement of the added vertex and its neighbors using the propagated metric values.

5. A method according to claim 4, wherein said applying of a coarse-to-fine parametrization algorithm further includes:

for each vertex split refinement operation, placing the newly added vertex at the centroid of the kernel of its neighborhood polygon; and optimizing the placement of the added vertex and its neighbors using the propagated metric values.

6. A method according to claim 1, wherein said propagating the metric values fine-to-coarse and said applying of the coarse-to-fine algorithm are repeated a plurality of times.

7. A method according to claim 1, whereby said generating causes the solutions obtained on level of detail approximations coarser than said finest level of detail approximation to accurately predict the final parametrization solution obtained at the end of the applying of the coarse-to-fine refinement process.

8. A method according to claim 1, wherein said generating includes constructing a sequence of meshes in a multiresolution representation by simplifying the chart mesh using at least one half-edge collapse operation and establishing a hierarchy over the chart using the sequence.

9. A method according to claim 8, wherein said constructing includes constructing said sequence based upon a quadric error metric that is directed to preservation of said at least one characteristic.

10. A method according to claim 1, wherein said generating of the sequence of meshes in a multiresolution representation includes generating a progressive mesh (PM) sequence.

11. A computer readable medium having stored thereon a plurality of computer-executable instructions for performing the method of claim 1.

12. A modulated data signal carrying computer executable instructions for performing the method of claim 1.

13. A computing device comprising means for performing the method of claim 1.

14. At least one computer readable medium having stored thereon a plurality of computer-executable modules for providing a fine-to-coarse look ahead in connection with parametrization in a graphics system, wherein parametrization refers to a one-to-one mapping between all points of a mesh and all points in the corresponding parametric domain, the computer executable modules comprising:

means for parametrizing at least one chart of an mesh utilizing a parametrization metric that generates and optimizes a plurality of metric values for said mesh, wherein the parametrization metric is based upon a function of at least one characteristic of the mesh; and means for generating a sequence of meshes in a multiresolution representation having a plurality of level of detail mesh approximations ranging from a coarsest level of detail approximation to a finest level of detail approximation for said at least one chart based upon at least said plurality of metric values, wherein the finest level of detail concerning said at least one characteristic of the mesh is taken into account while generating the parametrizations for level of detail approximations coarser than said finest level of detail approximation wherein said means for generating includes means for propagating the plurality of metric values fine-to-coarse from the original mesh to all meshes coarser than the original mesh; wherein said means for generating further includes means for generating an intermediate parametrization via a means for applying a coarse-to-fine parametrization algorithm that is based upon the propagated parametrization metric values; wherein the presence of said at least one characteristic is one of summed up and integrated, and stored as information for each mesh face of the fine mesh, to adequately reserve space on the coarse mesh parametrization for the presence of said at least one characteristic not yet added during said application of the coarse-to-fine refinement process.

15. At least one computer readable medium according to claim 14, wherein said means for propagating includes means for redistributing the metric values defined on triangles of the finest mesh to the triangles of the coarser meshes in the sequence.

16. At least one computer readable medium according to claim 14, wherein said means for applying a coarse-to-fine parametrization algorithm includes means for creating an initial embedding for at least one face in the original mesh using a brute-force optimization and the propagated metric values from the fine mesh.

17. At least one computer readable medium according to claim 16, wherein said means for applying a coarse-to-fine parametrization algorithm further includes:
for each vertex split refinement operation, means for placing the newly added vertex at a location within the kernel of its neighborhood polygon; and
means for optimizing the placement of the added vertex and its neighbors using the propagated metric values.

18. At least one computer readable medium according to claim 17, wherein said means for applying a coarse-to-fine parametrization algorithm further includes:
for each vertex split refinement operation, means for placing the newly added vertex at the centroid of the kernel of its neighborhood polygon; and
means for optimizing the placement of the added vertex and its neighbors using the propagated metric values.

19. At least one computer readable medium according to claim 14, wherein said means for propagating the metric values fine-to-coarse and said means for applying the coarse-to-fine algorithm are repeated a plurality of times.

20. At least one computer readable medium according to claim 14, whereby said means for generating causes the solutions obtained on level of detail approximations coarser than said finest level of detail approximation to accurately predict the final parametrization solution obtained at the end of operation of the means for applying of the coarse-to-fine refinement process.

21. At least one computer readable medium according to claim 14, wherein said means for generating includes means for constructing a sequence of meshes in a multiresolution representation by simplifying the chart mesh using at least one half-edge collapse operation and establishing a hierarchy over the chart using the sequence.

22. At least one computer readable medium according to claim 21, wherein said means for constructing includes means for constructing said sequence based upon a quadric error metric that is directed to preservation of said at least one characteristic.

23. At least one computer readable medium according to claim 14, wherein said means for generating the sequence of meshes in a multiresolution representation includes generating a progressive mesh (PM) sequence.

24. A modulated data signal carrying computer executable instructions output as a result of the execution of the plurality of computer-executable instructions of the computer readable medium of claim 14.

25. A computing device comprising means for carrying out the plurality of computer-executable instructions of the computer readable medium of claim 14.

26. A coprocessing device comprising means for carrying out the plurality of executable instructions of the computer readable medium of claim 14, at least in part in hardware fonm.

27. At least one computer readable medium comprising computer executable modules including computer executable instructions for providing a fine-to-coarse look ahead in connection with parametrization in a graphics system, wherein parametrization refers to a one-to-one mapping between all points of a mesh and all points in the corresponding parametric domain, the modules comprising:
means for parametrizing at least one chart of a mesh utilizing a parametrization metric that generates and optimizes a plurality of metric values for said mesh, wherein the parametrization metric is based upon a function of at least one characteristic of the mesh; and
means for generating a sequence of meshes in a multiresolution representation having a plurality of level of detail mesh approximations ranging from a coarsest level of detail approximation to a finest level of detail approximation for said at least one chart based upon at least said plurality of metric values, wherein the finest level of detail concerning said at least one characteristic of the mesh is taken into account while generating the parametrizations for level of detail approximations coarser than said finest level of detail approximation wherein said means for generating includes means for propagating the plurality of metric values fine-to-coarse from the original mesh to all meshes coarser than the original mesh; wherein said means for generating further includes means for generating an intermediate parametrization via a means for applying a coarse-to-fine parametrization algorithm that is based upon the propagated parametrization metric values; wherein the presence of said at least one characteristic is one of summed up and integrated, and stored as information for each mesh face of the fine mesh, to adequately reserve space on the coarse mesh parametrization for the presence of said at least one characteristic not yet added during said application of the coarse-to-fine refinement process.

* * * * *

UNITED STATES PATENT AND TRADEMARK OFFICE
CERTIFICATE OF CORRECTION

PATENT NO. : 6,982,714 B2
APPLICATION NO. : 10/137931
DATED : January 3, 2006
INVENTOR(S) : Hoppe et al.

It is certified that error appears in the above-identified patent and that said Letters Patent is hereby corrected as shown below:

On page 2, in field (56), under "Other Publications" in column 1, line 8, after "Capture" insert -- , --.

On page 2, in field (56), under "Other Publications" in column 2, line 41, delete "et al," and insert -- et al., --, therefor.

In column 2, line 47, delete "Parametrization" and insert -- parametrization --, therefor.

In column 2, line 60, delete "describe" and insert -- described --, therefor.

In column 3, line 24, after "coarser" insert -- , --.

In column 5, line 58, delete "layers" and insert -- players --, therefor.

In column 6, line 2, after "support" insert -- a --.

In column 7, line 25, delete "101a" and insert -- 110a --, therefor.

In column 11, line 33, delete "NET's" and insert -- .NET's --, therefor.

In column 15, line 17, delete " $\overline{m}$ " and insert -- $\sqrt{m}$ --, therefor.

In column 15, line 54, delete "parametrization(S)" and insert -- parametrization(s) --, therefor.

In column 17, line 48, in Claim 1, after "approximation" insert -- ; --.

UNITED STATES PATENT AND TRADEMARK OFFICE
CERTIFICATE OF CORRECTION

PATENT NO. : 6,982,714 B2
APPLICATION NO. : 10/137931
DATED : January 3, 2006
INVENTOR(S) : Hoppe et al.

It is certified that error appears in the above-identified patent and that said Letters Patent is hereby corrected as shown below:

In column 19, line 3, in Claim 14, after "approximation" insert -- ; --.

Signed and Sealed this

Fifteenth Day of September, 2009

David J. Kappos
*Director of the United States Patent and Trademark Office*

UNITED STATES PATENT AND TRADEMARK OFFICE
CERTIFICATE OF CORRECTION

PATENT NO. : 6,982,714 B2
APPLICATION NO. : 10/137931
DATED : January 3, 2006
INVENTOR(S) : Hoppe et al.

It is certified that error appears in the above-identified patent and that said Letters Patent is hereby corrected as shown below:

In column 20, line 22, in Claim 26, delete "fonm" and insert -- form --, therefor.

In column 20, line 45, in Claim 27, after "approximation" insert -- ; --.

Signed and Sealed this

Thirteenth Day of October, 2009

David J. Kappos
*Director of the United States Patent and Trademark Office*